United States Patent Office 3,174,913
Patented Mar. 23, 1965

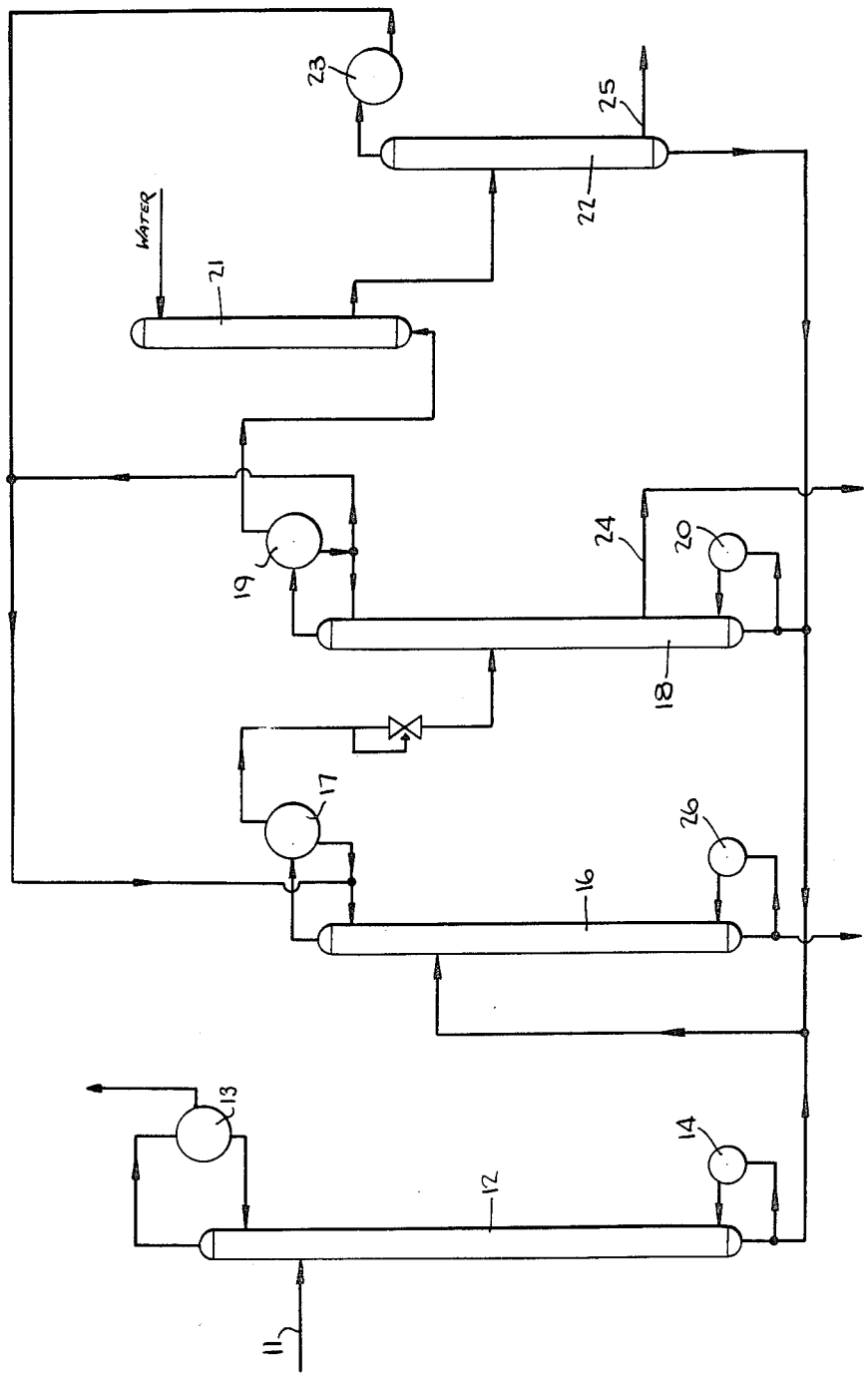

3,174,913
PRESSURE DISTILLATION OF AQUEOUS FORM-
ALDEHYDE WITH ACETONE REFLUX
Peter P. Gesting and Walter E. Heinz, Corpus Christi,
Tex., assignors to Celanese Corporation of America,
New York, N.Y., a corporation of Delaware
Filed Nov. 15, 1960, Ser. No. 69,366
21 Claims. (Cl. 202—51)

This invention relates to the purification of formaldehyde.

It is an object of this invention to provide a new and efficient method for the production of pure concentrated aqueous formaldehyde from dilute crude aqueous formaldehyde.

Another object of this invention is the provision of a novel method for purifying and dehydrating aqueous formaldehyde.

Other objects of this invention will be apparent from the following detailed description and claims. In this description and claims all proportions are by weight unless otherwise indicated.

In accordance with one aspect of this invention aqueous formaldehyde is fed continuously to a fractional distillation column, at an intermediate point thereof and a liquid comprising acetone is continuously supplied to a higher point on the column. This column, hereinafter called a "pressure column," is operated at superatmospheric pressure. From a lower point of the pressure column, preferably from its base, there is withdrawn a stream of water containing little, if any, formaldehyde. The pressure column is advantageously equipped with a partial condenser from which there is obtained a stream of vapors of acetone, formaldehyde and a small proportion of water. This vapor stream is fed to a second column, which is operated at a lower pressure than the first column, preferably at amospheric pressure. The second column, hereinafter termed an "acetone entrainment column," is also equipped with a partial condenser from which there is withdrawn a highly pure vapor stream of acetone and formaldehyde containing substantially no water. From the base of the acetone entrainment column there is obtained a stream of water containing a small proportion of formaldehyde; this stream may be recycled to the pressure column, as by mixing this stream with the aqueous formaldehyde fed to the pressure column.

The source of aqueous formaldehyde fed to the pressure column is advantageously the crude aqueous formaldehyde produced by absorption, in water, of part of the products of the vapor phase partial oxidation of hydrocarbons. One method of producing this crude aqueous formaldehyde is described in Dice U.S. Patents 2,570,215. The crude aqueous formaldehyde generally contains methanol and other light ends. We have found it best to remove most of these light ends by a preliminary distillation, in which the light ends and some of the water are taken overhead; such a distillation is conveniently effected at substantially atmospheric pressure or slightly higher, e.g., 10 p.s.i.g. using an aqueous feed containing about 12 to 20% formaldehyde and about 8 to 15% methanol. The residue from this preliminary distillation advantageously contains less than about 1%, e.g., about 0.3 to 0.5%, of methanol, about 16 to 20% formaldehyde and the remainder is subtantially water. This residue is fed to the pressure column.

In the operation of the pressure column, the rate of supply of the acetone-containing liquid is so controlled that the vapors leaving the top tray of the tower contain a controlled proportion of water, this proportion being such that the water:acetone ratio in these vapors is considerably greater than the azeotropic water:acetone ratio at the pressure of operation, while the water:formaldehyde ratio in these vapors is less than that in the feed. There is also withdrawn from the column (at a point lower than the point at which the aqueous formaldehyde is fed, preferably from the base of the column) a liquid residue stream of water containing very little, if any, formaldehyde. The vapors from the top of the column are advantageously passed to a partial condenser in which a greater proportion of the water than of the acetone is condensed so that the vapors leaving the condenser comprise a larger proportion of acetone and a smaller proportion of water, than the vapors entering said condenser. While the partial condenser may be eliminated and the vapors from the top of the pressure column may be passed directly to the acetone entrainment column, it has been found the use of a partial condenser advantageously decreases the required size of the entrainment column. The partial condenser is preferably operated at a pressure in the range of from atmospheric pressure to the same pressure as the pressure column and most preferably at the pressure of the pressure column. The liquid from the partial condenser is advantageously returned to the upper part of the column, preferably at a height proximate the height of the acetone-containing liquid being fed to said pressure column and most advantageously by incorporating this condensate into the acetone-containing liquid being supplied to the column.

It has been found that by controlling the supply of the acetone-containing liquid as described above, it is possible to greatly increase the proportion of the formaldehyde feed which appears in the overhead vapors from the pressure column and to greatly decrease the proportion of the formaldehyde in the aqueous residue stream obtained from the base of the pressure column. When the acetone-containing liquid is supplied at a higher rate, approaching that necessary to produce an overhead vapor in which the water-acetone ratio approximates that in the water-acetone azeotrope at the pressure of said overhead vapor, a much greater proportion of the formaldehyde appears in the base stream. Strangely, when the supply of the acetone-containing liquid is decreased, the proportion of the formaldehyde apeparing in the base stream is also increased. It has been found that best results are obtained by regulating the supply of acetone-containing liquid to the pressure column so as to produce an overhead stream in which the water:acetone ratio is considerably in excess of five times the azeotropic water:acetone ratio at the pressure of said overhead stream, e.g., at pressures in the neighborhood of 40 p.s.i.g., the water:acetone ration is in the range of from about 15 to 20 times the azeotropic water:acetone ratio.

In the operation of the pressure column, it is advantageous to maintain the vapor temperature at the top tray of the pressure column at about 110° to 140° C., preferably about 120° to 130° C., and to maintain the pressure at the top of the pressure column at a pressure above which a water-acetone azeotrope may form. It is known that water and acetone will not form an azeotrope at a pressure below 22.5 p.s.i.g. (e.g., see Othmer, D. F., and Morley, F. R., Industrial 2nd Engineering Chemistry, vol. 38, p. 751, 1946). The top pressure of the pressure column is advantageously about 25.0 to 60 p.s.i.g., preferably about 35 to 45 p.s.i.g. The partial condenser receiving these vapors is desirably operated so as to reduce the temperature of these vapors by about 5 to 25° C. The vapors leaving this partial condenser also contain water in a proportion, relative to acetone, considerably greater than that present in the water-acetone azeotrope at the pressure of said vapors; thus, the water:acetone ratio in the vapors leaving the partial condenser is desirably in the range of about 8 to 10 times the water:acetone ratio in the azeotrope at the pressure of said overhead stream. If desired, the partial condenser may be situated within the tower, above the top tray thereof as is described for example in U.S. Patent No. 2,542,316 to Eickmeyer. If desired, this partial condenser may be operated as a quench condenser, in which a cool liquid, e.g., acetone, may be fed continuously into direct contact with the vapors in said condenser; in such a process partial vaporization of the cooling liquid will occur.

Advantageously, acetone-containing liquid fed to the upper part of the column contains at least about 40% of acetone, with the only other materials present in substantial proportion being water and formaldehyde. The water content of this liquid is advantageously below about 30%, preferably below about 20%, e.g., in the range of about 15 to 20%. As pointed out above, this liquid may be a blend of the partial condensate and fresh acetone. When the partial condenser is operated as a quench condenser, as previously discussed, the fresh acetone may be fed to the condenser and the liquid effluent from the condenser may be supplied, as the acetone-containing liquid, to the upper part of the column.

The pressure column is desirably operated under such conditions that the breakpoint is substantially at the top tray of the column. For example, in one run the temperature at the top tray was 126° C. at the tray just below the top it was 132° C., while at the next lower tray it was 138° C. The temperature gradient between these three trays was greater than between any other three successive trays in the column.

After leaving the partial condenser, the vapors of acetone, formaldehyde and water preferably pass through a pressure-reducing valve and are then fed directly to an intermediate point of the acetone entrainment column. This column serves several functions. One function is to remove most of the water from the formaldehyde. We have discovered that it is much more efficient, in terms of heat consumption, and in reduction of pressure tower size, to take some water overhead from the pressure column and remove this water in the entrainment column, than to attempt to operate the pressure column under such conditions that no water is taken overhead. Second, the entrainment column makes it possible to remove impurities and residual methanol and other light ends which adversely affect the quality of the formaldehyde as well as the operation of the process. The impurities are present in the dilute aqueous formaldehyde, e.g., the aqueous formaldehyde obtained in the partial oxidation of hydrocarbons by the method described by Dice, U.S. Patent 2,570,215, and tend to remain with the formaldehyde in the vapors coming over from the pressure column. While the impurities are present in very small amounts and may be substantially colorless, their presence has a significant and undesirable effect on the bromine number of the resulting formaldehyde.

Another benefit which the use of the entrainment column makes possible is the removal of color bodies present in the formaldehyde. We have found that the pressure column operates most efficiently, in terms of overall heat consumption when the temperature of the vapors leaving the partial condenser of that column is high (e.g., above 100° C. at a pressure of 40 p.s.i.g.). However, at these temperatures color bodies tend to appear in the vapors. We have found that these color bodies tend to concentrate in the entrainment column at a point below the vapor feed point of that column and that they can be removed from the system by taking off a small continuous sidestream (e.g., about 0.5 to 5.0% of the weight of aqueous formaldehyde being fed to the pressure column) at a point where the color bodies concentrate which is at or below the breakpoint of the entrainment column. If desired, this sidestream can then be recycled to the preliminary distillation described previously, where most of the removed color bodies will be removed overhead. The entrainment column is preferably operated under such conditions that the temperature of the breakpoint (the zone in the column which has the greatest temperature gradient) is preferably in the range of from 56° to 70° C. and most preferably from 59° to 61° C. The breakpoint is advantageously below the vapor feed point up the column.

The acetone entrainment column is desirably operated at a pressure below about 10 p.s.i.g., preferably from about atmospheric pressure to 7 p.s.i.g., and at a top temperature below about 73° C., preferably about 53° to 67° C.

The vapors leaving the top of the entrainment column pass through a partial condenser where their temperature is reduced by about 5° to 20° C., preferably by 10° to 15° C. The condenser is preferably operated at atmospheric pressure at which pressure the operating temperature of the partial condenser is preferably below the boiling point of acetone and most preferably at a temperature from about 48° to about 52°. The preferable temperature range will increase slightly with increased operating pressures. It should be understood that the process of this invention will operate most advantageously when the condenser condenses sufficient acetone which is then recycled to the entrainment column to maintain a formaldehyde:acetone mole ratio in said column of at least 1:1 and most preferably a mole ratio of from 1 to 3 moles of formaldehyde per mole of acetone. The condensate formed in this partial condenser is principally acetone, with a small proportion of water and formaldehyde. A portion of this condensate is returned to the upper portion of the acetone entrainment column while another portion is used to supply part of the acetone-containing liquid feed to the pressure column. A major portion of the vapors flowing to this partial condenser are liquified.

The proportion of this condensate which returned to the top of the entrainment column is also relatively large, the ratio of liquid acetone so returned to formaldehyde being fed to the column being advantageously at least 15:1, preferably from 15:1 to 20:1. The amount of acetone being fed to the entrainment column must be sufficiently great to maintain the point at which the formaldehyde vapor is fed at a temperature below 70° C. at about atmospheric pressure. Where the ratio of acetone fed to formaldehyde fed falls below 15:1, the temperature of the point of the formaldehyde vapor fed goes above 70° C., reducing the proportion of the formaldehyde recovered from the column.

The nearly water-free vapors leaving the partial condenser may then be converted to concentrated purified aqueous formaldehyde by blending such vapors with controlled amounts of water. Thus these vapors may be passed through suitable scrubbing zone where they are brought into contact with cooler water and thereby condensed, preferably totally condensed to form a liquid mixture of water, formaldehyde and acetone. Where the water to be blended with the purified formaldehyde to produce the desired concentration is not sufficient in quantity to completely condense the vapor, it is preferable to cool the vapor prior to the addition of the water, e.g., by passing the vapor through a quench condenser to cool and condense said vapor and then passing the condensed vapor through the scrubbing zone. This liquid mixture may then be passed to another distillation column, hereinafter termed a finishing column for the removal of the acetone. In a preferred method of operation acetone vapors are taken overhead from the top of the finishing column. A vapor side stream of concentrated aqueous formaldehyde is removed near the base of the column, while a small liquid residue containing about the same ratio of formaldehyde to water as is present in the side stream is removed from the base for recirculation to the feed to the pressure column. The concentrated aqueous formaldehyde may also be removed as a liquid residue stream instead of as a vapor side stream. The finishing column and scrubber are conveniently operated at pressures in the range of about atmospheric pressure to 8 p.s.i.g., preferably at about atmospheric pressure.

The acetone vapors taken from the top of the finishing column contain small proportions of formaldehyde and water. These vapors are desirably liquefied and fed to the top of the pressure column, together with a portion of the liquid from the partial condenser of the acetone entrainment column and all the liquid from the partial condenser of the pressure column.

The accompanying drawing is a flow sheet of one preferred form of the process. In this drawing reference numeral 11 designates a source of crude aqueous formaldehyde, which is fed to a preliminary distillation column 12, equipped with a reflux condenser 13 and a reboiler 14. The residue from column 12 is fed to a pressure column 16 equipped with reboiler 26, the vapors from which pass, through a partial condenser 17, to an acetone entrainment column 18 equipped with reboiler 20. The vapors from the latter column, after passing through a partial condenser 19, are fed to a scrubbing zone 21, where they come in contact with a controlled proportion of water, and the resulting condensate is fed to a finishing column 22 from which there is removed a vapor side stream 25 of concentrated purified aqueous formaldehyde, taken off just above the base of the column.

From the top of the finishing column 22 there are taken off vapors made up principally of acetone. These are liquefied in condenser 23 and then fed to the top of the pressure column 16, together with the liquid from condenser 17 and a portion of the liquid from condenser 19. The other part of the liquid from condenser 19 is fed to the top of the entrainment column 18. The liquids from the bases of the entrainment column 18 and the finishing column 22 are combined with the feed to the pressure column. From the lower portion of the entrainment column, a liquid sidestream of color bodies is removed at 24.

The following example is given to illustrate this invention further.

*Example*

To the 35th tray of a preliminary distillation column 12, having 42 trays, there are fed 25.8 parts per hour of crude aqueous formaldehyde, containing 64% water and 22% formaldehyde together with methanol and other light ends in the amount of 12% and small amounts of less volatile impurities. The column 12 is operated at atmospheric pressure overhead, at an external reflux ratio of 13:1, an overhead temperature of 90° C., and a bottom temperature of 105° C. From the base of the column 12 there is drawn off a liquid containing 73% water and 25% formaldehyde together with minor proportions of impurities, including 0.5% methanol. This liquid is mixed with the residues from the entrainment column 18 and finishing column 22 to form a stream, containing 76% water and 22% formaldehyde, which is fed to the 30th tray of a 40 tray pressure column 16, operated at a pressure of 40 p.s.i.g. overhead, and an overhead temperature of 124° C. A liquid mixture of 44% acetone, 21% formaldehyde and 30% water is fed to the top tray of the column 16; this latter stream is fed at a rate, by weight, 4.5 times the rate of speed of the aqueous formaldehyde stream to the column 16.

From the base of the column 16, which is maintained at a temperature of 146° C., a stream of water and heavy ends, containing less than 1.0% of formaldehyde, is removed. The breakpoint of the column 16 is at the top tray, where the column temperature is 124° C.; the next lower tray is at a temperature of 136° C.

The overhead vapors from the column 16, containing 41% acetone, 31% water and 23% formaldehyde, are fed to a partial condenser operated at 40 p.s.i.g. and maintained at a temperature of 117° C., where 83% of the vapors are condenser, to produce a vapor stream containing 50% acetone, 23% water and 26% formaldehyde. The latter vapor stream is fed through a pressure reducing valve, to the 15th tray of a 30 tray acetone entrainment column 18, operated at about atmospheric pressure (3 p.s.i.g.). To the top tray of column 18, there is fed a liquid stream containing 94% acetone, 3% water and 3% formaldehyde, at a rate equal to 3.7 times the rate of feed of the vapor stream to column 18. From the base of the column 18, which is at 98° C., there is drawn off a liquid residue of dilute aqueous formaldehyde, containing minor amounts of methanol and color-forming impurities, while from the 4th tray of the column 18, at a temperature of 70° C. there is drawn off a liquid sidestream containing colored impurities; the rate of withdrawal of this sidestream is 2% of the feed to the 30th tray of pressure column 16.

The vapor from the top of entrainment column 18 at a temperature of 56° C. is passed, without substantial change in pressure, through a partial condenser 19 maintained at a temperature of 51° C., where 82% of the vapor is condensed. The condensate is used as the liquid feed to the entrainment column 18.

The vapors leaving the partial condenser 19 contains 66% acetone, 33% formaldehyde and less than 1% water. These vapors are scrubbed with 0.33 times their weight of liquid water and thus totally liquefied. The resulting blend is fed to the 1st tray of a 12 tray finishing column 22, operated at a pressure of 2 p.s.i.g. overhead, an overhead temperature of 60° C. with no external reflux. From the 1st tray of the column 22, there is drawn a vapor sidestream containing 50% of formaldehyde and 50% water, which stream may be liquefied by cooling, while from the base of the column 22 there is withdrawn a liquid stream of the same composition, at a rate which is 1% of the rate of withdrawal of the vapor side stream. The distillate from the column 22 is recycled, as liquid, to the pressure column 16.

It is to be understood that the foregoing detailed description is given merely by way of illustration and that many variations may be made therein without departing from the spirit of our invention.

Having described our invention that we desire to secure by Letters Patent is:

1. A process for the removal of water and impurities from aqueous formaldehyde comprising continuously feeding said aqueous formaldehyde to an intermediate point of a first fractional distillation zone maintained at a superatmospheric pressure, continuously supplying an acetone-containing liquid to a higher point of said zone, continuously withdrawing an aqueous residue from said zone at a point below said intermediate point and continuously taking overhead from said first distillation zone vapors of acetone, water and formaldehyde, and then continuously feeding said vapors to an intermediate point of a second fractional distillation zone maintained at a pressure below that of the first distillation zone, while continuously supplying an acetone-containing liquid to a higher point of said second zone, the ratio of liquid acetone supplied to said second zone to formaldehyde being supplied to said second zone being at least about 15 to 1 continuously withdrawing an aqueous residue low in formaldehyde and containing said impurities from said second zone at a point below the intermediate point of said second zone and continuously taking overhead from said second zone vapors comprising acetone, formaldehyde and water, the water:formaldehyde ratio in said resulting vapors being less than the water:formaldehyde ratio in the initial aqueous formaldehyde.

2. The process set forth in claim 1 wherein the rate of supply of acetone containing liquid to said first distillation zone is controlled to produce a water:acetone ratio in the overhead vapors from said first zone greater than the azeotropic water:acetone ratio at the pressure of said first zone.

3. The process set forth in claim 2, wherein said water:acetone ratio is at least 10 times the azeotropic water:acetone ratio at the pressure of said first zone.

4. The process set forth in claim 1, wherein the vapors taken overhead from said second zone are then subjected to partial condensation, the acetone-containing partial condensate being recycled to said second distillation zone to provide the acetone-containing liquid supplied to said zone.

5. The process set forth in claim 1, wherein said second distillation zone is maintained at about atmospheric pressure.

6. A process for the removal of water and impurities from aqueous formaldehyde comprising continuously feeding said aqueous formaldehyde to an intermediate point of a first fractional distillation zone maintained at a super atmospheric pressure, continuously supplying an acetone-containing liquid to a higher point of said zone, continuously withdrawing an aqueous residue low in formaldehyde from said zone at a point below said intermediate point, continuously taking overhead, from said first distillation zone, vapors of acetone, water and formaldehyde and then subjecting said vapors to partial condensation to decrease the proportion of water in said vapors, the acetone-containing partial condensate being recycled to be supplied as part of the acetone-containing liquid to the first distillation zone, the rate of supply of the total acetone-containing liquid being controlled to produce a water:acetone ratio in said partially-condensed vapors greater than the azeotropic water:acetone ratio at the pressure of said first distillation zone and then continuously feeding said partially condensed vapors to an intermediate point of a second fractional distillation zone maintained at atmospheric pressure while continuously supplying an acetone-containing liquid to a higher point of said second zone, the ratio of liquid acetone supplied to said second zone to formaldehyde being supplied to said second zone being at least about 15 to 1 continuously withdrawing an aqueous residue containing said impurities from said second zone at a point below the intermediate point of the second zone and recycling and mixing said residue with the aqueous formaldehyde being fed to the first distillation zone, continuously taking vapors overhead from the second distillation zone and subjecting said vapors to partial condensation, part of the acetone containing condensate being recycled to the second distillation zone to provide the acetone-containing liquid supplied to said zone and the remainder of said condensate being recycled to the first distillation zone to provide part of the acetone-containing liquid supplied to said zone, the vapors after partial condensation comprising acetone and formaldehyde substantially free of water.

7. Process as set forth in claim 2 in which the acetone-containing liquid supplied to the first distillation zone contains at least about 40% of acetone, the balance of the liquid being principally water and formaldehyde.

8. Process as set forth in claim 5 in which the acetone-containing liquid supplied to the first distillation zone contains at least about 40% of acetone, the balance of the liquid being principally water and formaldehyde.

9. Process as set forth in claim 8 in which the water content of said acetone-containing liquid is in the range of about 1 to 30%.

10. Process as set forth in claim 1 wherein the acetone-water breakpoint in said first zone is maintained at the top of said zone.

11. Process as set forth in claim 1 wherein the top of said first distillation zone is maintained at a temperature range of about 110 to 140° C.

12. Process as set forth in claim 1 wherein the top of said second distillation zone is maintained at a temperature range of about 53 to 73° C.

13. The process defined in claim 1 including the further step of continuously removing color bodies and other impurities by withdrawing a sidestream liquid containing said bodies and impurities from said second distillation zone below the vapor feed point at a point where said color bodies concentrate.

14. The process defined in claim 5 including the further step of continuously removing color bodies and other impurities by withdrawing a sidestream of liquid containing said bodies and impurities from said second distillation zone at or below the temperature breakpoint of said second distillation zone.

15. The process set forth in claim 14 wherein said sidestream weighs from 0.5 to 5.0% of the weight of aqueous formaldehyde being fed to said first fractional distillation zone.

16. A process for making pure formaldehyde substantially free of water from the crude aqueous formaldehyde produced by absorption, in water, of part of the products of the vapor phase partial oxidation of hydrocarbons which process comprises subjecting the crude aqueous formaldehyde to a preliminary distillation to remove overhead the light ends and some water and continuously feeding the aqueous formaldehyde residue to an intermediate point of a first fractional distillation zone maintained at a superatmospheric pressure, continuously supplying an acetone-containing liquid to a higher point of said zone, continuously withdrawing an aqueous residue low in formaldehyde from said zone at a point below said intermediate point, continuously taking overhead, from said first distillation zone, vapors of acetone, water and formaldehyde and then subjecting said vapors to partial condensation to decrease the proportion of water in said vapors, the acetone containing partial condensate being recycled to be supplied as part of the acetone-containing liquid to the first distillation zone, the rate of supply of the total acetone-containing liquid being controlled to produce a water:acetone ratio in said partially condensed vapors greater than the azeotropic water:acetone ratio at the pressure of said first distillation zone and then continuously feeding said partially condensed vapors to an intermediate point of a second fractional distillation zone maintained at atmospheric pressure while continuously supplying an acetone-containing liquid to a higher point of said second zone, the ratio of liquid acetone supplied to said second zone to formaldehyde being supplied to said second zone being between about 15 and 20 to 1 continuously withdrawing an aqueous residue low in formaldehyde and containing said impurities from said second zone at a point below the intermediate point of the second zone and recycling and mixing said residue with the aqueous formaldehyde being fed to the first distillation zone, and continuously taking vapors overhead from the second distillation zone and subjecting said vapors to partial condensation, part of the acetone containing condensate being recycled to the second distillation zone to provide the acetone-containing liquid supplied to said zone and the remainder of said condensate being recycled to the first distillation zone to provide part of the acetone-containing liquid supplied to said zone, the vapors after partial condensation comprising acetone and formaldehyde substantially free of water.

17. A process for making purified concentrated formaldehyde from the crude aqueous formaldehyde produced by absorption, in water, of part of the products of the vapor phase partial oxidation of hydrocarbons which process comprises subjecting the crude aqueous formaldehyde to a preliminary distillation to remove overhead the light ends and some water and then continuously feeding the aqueous formaldehyde residue to an intermediate point of a first fractional distillation zone maintained at a superatmospheric pressure, continuously supplying an acetone containing liquid to a higher point of said zone, continuously withdrawing an aqueous residue from said zone at a point below said intermediate point and continuously taking overhead from said first distillation zone vapors of acetone, water and formaldehyde, the rate of supply of said acetone containing liquid being controlled to produce a water:acetone ratio in said vapors greater than the azeotropic water:acetone ratio at the pressure of said first zone and then continuously feeding said vapors to an intermediate point of a second fractional distillation zone maintained at a pressure below that of the first distillation zone, continuously supplying an acetone containing liquid to a higher point of said second zone, the ratio of liquid acetone supplied to said second zone to formaldehyde being supplied to said second zone being between about 15 and 20 to 1 continuously withdrawing an aqueous residue containing impurities from said second zone at a point below said intermediate point of the second zone continuously withdrawing a sidestream containing said bodies and impurities from said second distillation zone at or below the temperature breakpoint of said second distillation zone, continuously taking overhead vapors from said second zone, blending the overhead vapors from said second zone with selected amounts of cooler water to form a liquid mixture of water, acetone and formaldehyde, substantially free of impurities and then removing the acetone by distillation to leave pure aqueous formaldehyde, the concentration of which is determined by the amount of water which was blended with the vapors from the second zone.

18. A process for making purified concentrated aqueous formaldehyde from the crude aqueous formaldehyde produced by absorption, in water, of part of the products of the vapor phase partial oxidation of hydrocarbons which process comprises subjecting the crude aqueous formaldehyde to a preliminary distillation to remove overhead the light ends and some water and then continuously feeding the aqueous formaldehyde residue to an intermediate point of a first fractional distillation zone maintained at a super-atmospheric pressure, continuously supplying an acetone-containing liquid to a higher point of said zone, continuously withdrawing an aqueous residue low in formaldehyde from said zone at a point below said intermediate point, continuously taking overhead, from said first distillation zone, vapors of acetone, water and formaldehyde and then subjecting said vapors to partial condensation to decrease the proportion of water in said vapors, the acetone containing partial condensate being recycled to be supplied as part of the acetone-containing liquid to the first distillation zone, the rate of supply of the total acetone-containing liquid being controlled to produce a water:acetone ratio in said partially condensed vapors greater than the azeotropic water:acetone ratio at the pressure of said first distillation zone and then continuously feeding said partially condensed vapors to an intermediate point of a second fractional distillation zone maintained at atmospheric pressure while continuously supplying an acetone containing liquid to a higher point of said second zone, continuously withdrawing an aqueous residue low in formaldehyde and containing said impurities from said second zone at a point below the intermediate point of the second zone and recycling and mixing said residue with the aqueous formaldehyde being fed to the first distillation zone, continuously taking vapors overhead from the second distillation zone, subjecting said vapors to partial condensation, part of the acetone containing condensate being recycled to the second distillation zone to provide the acetone containing liquid supplied to said zone and the remainder of said condensate being recycled to the first distillation zone to provide part of the acetone containing liquid supplied to said zone, the ratio of liquid acetone supplied to said second zone to formaldehyde being supplied to said second zone being between about 15 and 20 to 1 the vapors after partial condensation comprising acetone and formaldehyde substantially free of water and then continuously passing these resulting vapors through a scrubbing zone where they are brought into contact with controlled amounts of cooler water to form a liquid mixture of water, formaldehyde and acetone, continuously feeding said liquid mixture to an upper point in a finishing fractional distillation zone from which acetone vapors are taken off overhead and concentrated aqueous formaldehyde vapor is withdrawn from said finishing zone at a point below that of the feed.

19. The process set forth in claim 18, wherein the acetone vapors taken from the finishing zone are condensed and recycled to be supplied as part of the acetone-containing liquid to the first distillation zone and the liquid residue remaining in the finishing zone is recycled and mixed with the aqueous formaldehyde feed to the first distillation zone.

20. The process set forth in claim 4, wherein said partial condensation is conducted at a pressure of from the pressure of said first zone to the pressure of said second zone.

21. The process set forth in claim 16 wherein said liquid mixture from said scrubbing zone is fed to the top of said finishing fractional distillation zone.

References Cited in the file of this patent
UNITED STATES PATENTS

| | | |
|---|---|---|
| 2,452,414 | Wong | Oct. 26, 1948 |
| 2,527,654 | Pyles et al. | Oct. 31, 1950 |
| 2,565,568 | McCants | Aug. 28, 1951 |
| 2,578,338 | Craven | Dec. 11, 1951 |
| 2,798,033 | Lloyd | July 2, 1957 |